United States Patent [19]

Charriere

[11] Patent Number: 5,109,036

[45] Date of Patent: Apr. 28, 1992

[54] ANAEROBIC ADHESIVE COMPOSITIONS AND METHOD

[75] Inventor: Bruno Charriere, Jurancon, France

[73] Assignee: CECA, S.A., Courbevoie, France

[21] Appl. No.: 654,248

[22] Filed: Feb. 12, 1991

[30] Foreign Application Priority Data

Feb. 23, 1990 [FR] France .................... 9002239

[51] Int. Cl.⁵ .............. C09J 11/06; C09J 133/08
[52] U.S. Cl. .................... 523/176; 524/189; 526/213; 526/214; 526/219
[58] Field of Search ............ 523/176; 526/213, 214, 526/219; 524/189

[56] References Cited

U.S. PATENT DOCUMENTS 3,281,305 10/1966 Nader et al.
3,984,385 10/1976 Gruber et al. .............. 526/217
3,987,019 10/1976 Gruber et al. .............. 526/328
3,987,234 10/1976 Gruber et al. .............. 526/328
4,287,330 9/1981 Rich ............................ 526/270
4,321,349 3/1982 Rich ............................ 526/270
4,764,239 8/1988 Jacobine et al. ............ 156/307.3

*Primary Examiner*—Paul R. Michl
*Assistant Examiner*—John J. Guarriello

[57] ABSTRACT

Improved anaerobic adhesive compositions are described which contain an alkylsulfonylphenylhydrazine as the accelerator. The compositions are remarkably stable in storage but nevertheless set quickly upon anaerobic contact on the most diverse materials. They are particularly advantageous for the retention and making tight of threadings and smooth fitting made of treated steel, e.g., zinc-coated or bichromated steel.

7 Claims, No Drawings

ANAEROBIC ADHESIVE COMPOSITIONS AND METHOD

BACKGROUND OF THE INVENTION

The present invention pertains to an improvement in the formulations of anaerobic glues and adhesives.

It is known that various materials, especially metallic materials, can be joined using adhesives based on dimethacrylates that are formulated in such a manner that the hardening of these adhesives occurs as soon as they are removed from contact with the air. It is then sufficient to coat the surfaces to be joined with such an adhesive and to bring them together tightly, which induces polymerization of the adhesive and formation of a definitive bond.

These adhesives, which are often referred to as "anaerobic resins", are very widely employed in the field of mechanics to achieve the retention and tightness of threaded pieces such as screws, nuts, bolts, pins, etc. They also have an important role in the joining by attachment of small pieces (for example, for the attachment of wheels, pulleys or ball bearings on their axles) in which they advantageously replace the traditional techniques such as press assembly, banding and brazing and eliminate the need for supplementary joining pieces (keys, pins, washers and locking screws, etc.).

These anerobic adhesive compositions are based, in a very conventional manner, on a polyacrylic ester or a mixture of polyacrylic esters capable of radical polymerization at room temperature, such as tetraethylene glycol dimethacrylate, combined with substances capable of initiating the radical polymerization of the said polyacrylic esters by generation of free radicals as soon as the mixture is removed from the action of oxygen and of maintaining or accelerating this polymerization; traditionally an organic peroxide or hydroperoxide such as cumyl hydroperoxide combined with dimethylparatoluidine. Such base formulations are described in U.S. Pat. No. 3,218,305. They were subsequently improved by the addition of oxidation inhibitors, metallic complexing agents and viscosity additives, etc.

The base formulations set relatively slowly and attempts have been made to resolve this drawback by means of a suitable selection of the accelerator. For this purpose, use has been made of highly diverse nitrogen compounds, notably hydrazine derivatives such as, for example, ethyl carbazate or N-aminorhodanine (FR 1,580,572), acetylphenylhydrazine (FR 2,311,832), paranitrophenylhydrazine (FR 2,283,191) or para-tolysulfonylhydrazide (FR 2,283,190). The most commonly obtained results are an appreciable increase in the setting speed on ferrous materials but at the price of an often noteworthy loss in the storage stability of the product and a real difficulty in obtaining polymerization of the adhesive on nonferrous surfaces or treated surfaces such as galvanized or bichromated steel.

SUMMARY OF THE INVENTION

The present invention resolves these drawbacks. It has now been discovered that accelerators based on alkylsulfonylphenylhydrazines make possible the creation of anerobic adhesive formulations that are surprisingly reactive on steel as well as on other metal surfaces and even on glass, while still preserving a very high storage stability and developing bond strengths which are very comparable and even superior to those of the known formulations of the prior art.

The invention is thus comprised of anaerobic adhesive compositions containing a polyacrylic ester and/or a mixture of polyacrylic esters capable of radical polymerization at room temperature, combined with substances capable of initiating the radical polymerization of the said polyacrylic esters by generation of free radicals as soon as the mixture is removed from the action of oxygen, and of maintaining or accelerating this polymerization; this composition is characterized by containing alkylsulfonylphenylhydrazines. The invention also comprises the method of mating at least two metal pieces made of galvanized or bichromated steel utilizing this novel anaerobic adhesive.

DETAILED DESCRIPTION

The polyacrylic esters which enter into the formulation of anerobic compositions in accordance with the invention are compounds with the general formula:

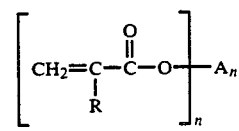

that contain at least two acrylic ester groups (n being equal to at least 2) and in which R represents hydrogen or a $C_1$ to $C_3$ alkyl radical, notably methyl and in which $A_n$ is an organic n-valent (at least bivalent) radical containing at least two carbon atoms.

The polyacrylic esters which are particularly suitable for the implementation of the invention are the tetramethylene or hexamethyleneglycol diacrylates and dimethacrylates and the di, tri or tetra-ethyleneglycol or dipropyleneglycol diacrylates and dimethacrylates. But one can advantageously employ acrylic polyesters that result from the condensation of a mono(meth)acrylate with aliphatic diols (such as those cited above), with aromatic diols (for example, derived from bisphenol A) or with polyether, polyester or polyurethane-polyols having a molecular weight which is generally between 200 and 10,000. The polyacrylates or polymethacrylates can be obtained either directly by esterification between the poyol employed and acrylic or methacrylic acid, or indirectly by reaction of a hydroxyalkyl acrylate or methacrylate with the polyol which has previously been "covered" with isocyanate functions by reaction with an excess of a diisocyanate. These various polyacrylates-esters are well known by the expert in the field of anaerobic glues.

The compositions in accordance with the invention can also contain multifunctional acrylates and methacrylates which contain in the nonacrylic part of their molecule chemical functions which are capable of bestowing specific properties, for example improvement of adhesion to the subtrate, decrease in shrinkage upon polymerization or improvement in the compatibility and the solubility among the various components of the anaerobic composition. As nonexhaustive examples, one can mention the acrylates and methacrylates of methyl, ethyl, butyl, ethylhexyl, lauryl, 2-hydroxyethyl, 2-hydroxypropyl, tetrahydrofurfuryl, dicyclopentadienyl, dicylpentadienyl-oxyethyl, phenyl, cyclohexyl and 2-phenoxyethyl which are all part of the array of monomers readily employed by the expert in the field.

The organic peroxides and hydroperoxides employed in the invention are compounds which are soluble in the aforementioned polyacrylic esters; they act as generators of free radicals but their action is inhibited by the presence of oxygen. One readily uses the dialkyl peroxides, e.g., dicumyl peroxide, ditertiobutyl peroxide and dilauroyl peroxide or tertiobutyl cumyl hydroperoxide and methylethylketone hydroperoxide. The compounds are also well known by those skilled in this field.

The polymerization accelerators, also referred by as activators, are generally nitrogen compounds. The accelerators comprised of tertiary amines, more especially aromatic tertiary amines, have been known for a long time. They are combined with various co-accelerators, most often with compounds that have a pronounced electron "acceptor" character, e.g., the aromatic sulfimides. In particular, the combination in a formulation of a nitrogen compound with an electron "donor" character, such as a tertiary aromatic amine (e.g., the dimethylanilines or dimethyltoluidines) with benzoic sulfimide (saccharin) has the well established property considerably increasing the reactivity of the anaerobic composition without, however, harming its stability when it is stored in the presence of air.

Among the characteristic alkylsulfonylphenylhydrazines of the invention, 4-(methylsulfonyl)hydrazine [877-66-7] is preferred. The following can also be envisaged:
4-(butylsulfonyl)phenylhydrazine [536542-21-0],
4-(ketylsulfonyl)phenylhydrazine [1590-67-6],
4-(difluoro-methylsulfonyl)phenylhydrazine [4837-28-9],
4-(trifluoro-methylsulfonyl)phenylhydrazine [4837-29-0],
4-(2-propenylsulfonyl)phenylhadrazine [62453-93-4],
4-(2-butenylsulfonyl)phenylhydrazine [62453-95-6],
4-(phenylsulfonyl)phenylhydrazine [70114-83-9],
as well as their ortho or para substituted derivatives:
4'-methylphenyl-4-(phenylsulfonyl)phenylhdrazine [80912-28-3],
4'-methoxyphenyl-4-(phenylsulfony)phenylhydrazine [118316-89-5],
4'-phenoxyphenyl-4-(phenylsulfony)phenylhydrazine [118316-91-9],
4'-chlorophenyl-4-(phennylsulfonyl)phenylhydrazine [100062-12-2],
2'-methoxyphenyl-4-(phenylsulfonyl)phenylhydrazine [118316-88-4] or
5'dimethylphenyl-4-(phenylsulfonyl)phenylhydrazine [118316-92-0].

Also included among the sulfonylphenylhydrazines which are subject of this invention are the ortho-substituted derivatives of the above compounds, notably:
2-chloro-4-(methylsulfonyl)phenylhydrazine [85634-77-1),
2-chloro-4-(ketylsulfonyl)phenylhydrazine [1590-66-5], or
2-nitro-4-(phenylsulfonyl)phenylhydrazine [856.34-77-1] and
2,6-dichloro-4-(methylsulfonyl)phenylhydrazine [111245-85-3].

Also included in this class are the disulfonyl derivatives such as
2,4-di(methylsulfony)phenylhydrazine [57396-91-5] or
2,4-bis(difluoromethyl)phenylhydrazine [27696-61-3].

As was the case with the anaerobic formulations of the prior art, oxidation inhibitors are used in the formulations of the present invention; these substances prevent the untimely polymerization of acrylic or vinylic monomers in general. They are the quinones, hydroquinones and the hindered phenol derivatives such as ditertiobutyl-2,6-methyl-4-phenol, etc.

Optionally, it is also possible to employ complexing agents to combat the harmful influence of metal ions, impurities which are introduced into the anaerobic compositions with the formulation ingredients, but especially by contact with the metal parts of the manufacturing, handling and storage materials. These are chelating agents, among which it is possible to mention in a nonexhaustive manner the aminocarboxylates, particularly the alkaline salts of ethylenediaminetetracetic acid, salicyladlehyde, the aminophenols, bipyridyl and its derivatives, orthophenanthroline, 8-hydroxyquinoleine, N,N'-ethylene-bis(2-pyridinecarbaldimine), and the like.

Other additives are also included in these anaerobic formulations such as thickening agents, thioxtropic agents, plasticizers and coloring agents; these are all conventional agents which are well known by the expert in the field, and about which it is not necessary to provide additional information.

Among the advantages which will be seen clearly in the presentation of certain examples, emphasis is placed on the anaerobic activity of the adhesives in accordance with the invention in relation to treated steels and on the high value of the joining strengths thereby achieved. Notably, the adhesives in accordance with the invention provide a satisfactory technical solution to the blocking of screw-bolt systems in retention and to the correct transmission of torques by the attachment joining to smooth axles made of ordinary steel and especially of treated steels and provide for securely mating of such metal pieces.

In the following examples, the essential components of the formulations are indicated by the convention abbreviations shown below:

| | |
|---|---|
| TEGMA = | tetraethylene glycol dimethacrylate |
| HPC = | cumyl hydroperoxide |
| DMpT = | dimethylparatoluidine |
| APH = | acetylphenylhydrazine |
| NPH = | 4-nitrophenylhydrazine |
| DNPH = | 2,4-dinitrophenylhydrazine |
| MSPH = | 4-(methylsulfonyl)phenylhdrazine |
| BS = | saccharin (abbreviation of benzoic sulfimide) |

The anaerobic polymerization capability of the glues were determined in the threads of a screw-bolt assembly in accordance with the following operating procedure. Several drops of the test adhesive are applied on the threads of a screw that has been degassed in advance; the corresponding nut is then screwed on without tightening it. After a determined period of time, it is determined whether it is possible to unscrew the bolt manually. The operation is repeated with other bolts so as to determine by means of successive attempts one minute apart the time at which the adhesive is sufficiently hardened so that the assembly cannot be unscrewed manually. This duration of time will be referred to below as the "fixation time."

The quality of the bond created in this manner is evaluated quantitatively by measuring the unscrewing braking torque ($C_{FD}$) of the screw-bolt assembly after a selected duration of anaerobic hardening at the temperature selected for this hardening. The measurement is carried out in accordance with the standard NF T 76-124.

The anaerobic polymerization capability between glass surfaces is evaluated in the following manner. A drop of solution is deposited on a glass slide (slide for optical microscope observations). A second slide is then placed on the first slide in such a manner that the two slides cover each other partially over a length of circa two centimeters. After waiting a few moments for the liquid drop to distribute itself in a thin and uniform layer between the two glass slides, a weight of 50 g is placed on the slides. Thus the "setting time on glass" is described as the duration of time at the end of which the anaerobic composition has sufficiently hardened that when one of the two slides is held vertically by one end, the other slide cannot move under the action of its own weight.

The method employed for evaluating the stability of the anaerobic compositions during storage is comprised of putting 30 g of solution in a 60-mL capacity polyethylene flask such that the adhesive is in contact with an equal volume of air above the liquid. The stoppered flask is placed in an oven at 82° C. and the time during which the composition remains liquid is measured. This duration of time, which is referred to as the "stability at 82° C.", is a measurement of the ability of the composition to not polymerize spontaneously when it is stored in the presence of air. Although there is no simple relationship between this measurement at 82° C. and the real stability of the adhesive composition when it is stored at room temperature, experience has shown that formulations which are stable for 30 to 60 minutes at 82° C. are sufficiently stable for commercial use and will be still usable after circa one year of storage at room temperature. However, it is desirable that the stability at 82° C. be greater than several hours. This assures, in particular, that the composition could be subjected to relatively unfavorable storage conditions without being damaged.

The invention will be further described in connection with the following examples which are set forth for purposes of illustration only.

EXAMPLE 1

A reference solution containing 100 g of triethyleneglycol dimethacrylate stabilized with approximately 100 ppm of paramethoxyphenol was prepared; 4 g of 75% cumyl hydroperoxide and 0.5 g of a stabilizing solution comprised of 20 parts by weight of hydroquinone and 0.2 parts of N,N'-ethylenebis(2-pyridinecarbaldimine) in 80 parts of methanol were added to the reference solution. This mother solution was divided into four parts which were used for the preparation of four anaerobic formulations by adding to each of these parts 0.3% by weight of one of the following compounds: dimethylparatoluidine (DMpT), 4-(methylsulfonyl)phenylhydrazine (MSPH), 1-acetyl-2-phenylhydrazine (APH) and (2,4-dinitrophenyl)hydrazine (DNPH); these solutions were then stirred in the presence of air for circa 24 hours.

The fixation time of these four anaerobic formulations was determined on screw/bolt assemblies made of raw steel M8×30—class 6.8 (Standards NF E 25-100 and 24-112) which had previously been degreased with trichloroethylene; the braking torques ($C_{FD}$) were also determined on the same screw/bolts after two hours and after 24 hours of anaerobic hardening at room temperature. The results are set forth in Table 1 below.

TABLE NO. 1

| Accelerator | Fixation time (minutes) | Unscrewing torque $C_{FD}$ (Nm) | |
|---|---|---|---|
| | | after 2 hours | after 24 hours |
| DMpT | 120 minutes (1) | 0 | 0 (2) |
| MSPH | 30 minutes | 6 | 9 |
| APH | 60 minutes | 0 | 9 |
| DNPH | >120 minutes | 0 | 0 (2) |

Notes:
(1) The test was suspended after two hours.
(2) The anaerobic composition polymerized partially but the torque obtained was too weak to be measured.

It can been seen clearly that even in the absence of a co-accelerator, (methylsulfonl)phenylhydrazine is capable of quickly initiating anaerobic polymerization with a efficacy which is sufficient for the anaerobic composition to exert an appreciable unscrewing torque after only two hours of hardening.

EXAMPLE 2

Example No. 1 was repeated with the two compounds that yielded a measurable braking torque but this time with the addition to the base formulation of 1% weight of each accelerator rather than 0.3%.

In addition, in order to determine the maximum unscrewing torque that can be obtained when the crosslinking of the composition is complete, torque measurements were carried out after baking at 100° C.

TABLE NO. 2

| Accelerator | Fixation Time | Unscrewing torque(Nm) | | |
|---|---|---|---|---|
| | | 2 hrs at 23° C. | 24 hrs at 23° C. | 1 hr at 100° C. |
| MSPH | 9 minutes | 5 | 11 | 16 |
| APH | 60 minutes | 0 | 2 | 7 |

The setting time was thus considerably reduced in the case in which MSPH was used and the unscrewing torque was clearly higher for all anaerobic hardening cycles.

EXAMPLE 3

A reference solution identical to that of Example 1 was prepared. This mother solution was divided into five parts and five anaerobic formulations were prepared by adding to each 0.1% by weight of one of the following compounds:
dimethylparatoluidine (MDpT)
4-(methylsulfonyl)phenylhydrazine (MSPH)
1-acetyl-2-phenylhydrazine (AHP)
4-nitrophenylhydrazine (NPH)
(2,3-dinitrophenyl)hydrazine (DNPH)

These solutions were stirred in the presence of air for circa 24 hours.

Following the method described above, the fixation times of these adhesive compositions were determined on M8×30 class 6.8 bolts made of ordinary steel, on the one hand, and of bichromated galvanized steel (Z5F), on the other hand. The results are shown in Table 3A below.

TABLE NO. 3A

| | Fixation time on | |
|---|---|---|
| Accelerator | steel bolts | bichromated steel bolts |
| DMpT | >4 hours | >24 hours |
| MSPH | 15 minutes | 7 hours |
| APH | >4 hours | >24 hours |

TABLE NO. 3A-continued

| Accelerator | Fixation time on | |
|---|---|---|
| | steel bolts | bichromated steel bolts |
| NPH | 16 minutes | >24 hours |
| DNPH | >4 hours | >24 hours |

It can be seen clearly that with this type of formulation which only contains 0.1% of accelerator it is impossible with most of the traditionally employed compounds to obtain an anaerobic hardening within a reasonable period of time. Only (methylsulfonyl)phenylhydrazine and 4-nitrophenylhydrazine are capable of quickly initiating polymerization on ordinary steel. However, in the case in which the bolts employed are covered with a passivating layer of zinc bichromate, the only one of the above five anaerobic compositions that hardens in less than 24 hours at room temperature is the one containing methylsulfonylphenylhydrazine. Thus, this compound makes it possible to obtain anaerobic adhesives with a substrate sensitivity which is reduced in relation to the products of the prior art.

Using another series of M8×30 class 6.8 bolts made of ordinary steel, the unscrewing braking torques of the five above formulations were determined after baking for one hour at 100° C. The results are shown in Table 3B.

TABLE 3B

| Accelerator | Unscrewing braking torque $C_{FD}$(Nm) |
|---|---|
| DMpT | 12 Nm |
| MSPH | 19 Nm |
| APH | 11 Nm |
| NPH | 16 Nm |
| DNPH | 8 Nm |

The highest torque was obtained with the formulation containing MSPH.

EXAMPLE 4

A reference solution with the following composition was prepared:

| Triethylene glycol dimethacrylate | 100 g |
|---|---|
| paramethoxyphenol | 0.01 g |
| 75% cumyl hydroperoxide | 4 g |
| stabilizing solution (cf. Example 1) | 0.5 g |
| benzoic sulfimide | 0.4 g |

This composition differed from the composition in Example 1 in that it also contained benzoic sulfimide (saccharin) as a co-accelerator.

This mother solution was divided into five parts; five anaerobic formulations were prepared by adding 0.3% by weight of one of the following compounds to each of the parts:
  dimethylpratoluidine (DMpT)
  4-(methylsulfonyl)phenylhydrazine (MSPH)
  1-acetyl-2-phenylhydrazine (APH)
  4-nitrophenylhydrazine (NPH)
  (2,4-dinitrophenyl)hydrazine (DNPH)

These solutions were stirred in the presence of air for circa 24 hours. It could be seen that the solution containing nitrophenylhydrazine (NPH) polymerized spontaneously despite the presence of air above the liquid. Repetition of the experiment led to the same result, which confirms that the combined use of 4-nitrophenylhydrazine and saccharin results in an unstable composition for which the presence of air is not sufficient for inhibiting polymerization; the corresponding composition was eliminated from the remainder of the test.

Employing the method described above, the fixation times were determined for the four remaining compositions on three types of M8 bolts made of ordinary steel class 6.8, steel class 8.8 (standards NF E 25-100 and 25-112) and of bichromated galvanized steel Z5F (see Table No. 4).

TABLE NO. 4

| Accelerator | Steel 6.8 | Fixation Time on Steel 8.8 | Bichromated Steel |
|---|---|---|---|
| DMpT | 30 minutes | >2 hours | >2 hours |
| MSPH | 3 minutes | 5 minutes | 60 minutes |
| APH | 5 minutes | 20 minutes | >2 hours |
| DNPH | 10 minutes | 25 minutes | >2 hours |

It can be seen that the simultaneous use of MSPH and saccharin as co-accelerators makes it possible to obtain anaerobic compositions with very high performances on both ordinary substrates (steel 6.8 and 8.8) and on passivated substrates, for which an appreciable unscrewing torque is normally not obtained until after many hours of anaerobic hardening.

EXAMPLE 5

The prior art discloses the improvement of the reactivity of anaerobic compositions by means of the use as a co-accelerator of a nitrogen compound that has an electron "donor" nature, usually a tertiary aromatic amine such as dimethylparatoluidine.

Here we carried out a comparative example of the accelerator in accordance with the invention in such systems; to accomplish this, a reference solution was prepared with the following composition:

| triethylene glycol dimethacrylate | 100 g |
|---|---|
| paramethoxyphenol | 0.01 g |
| 75% cumyl hydroperoxide | 4 g |
| stabilizing solution (cf. Example 1) | 0.5 g |
| dimethylparatoluidine (DMpT) | 0.4 g |

This mother solution was divided into five parts; five anaerobic formulations were prepared by adding to each of the five parts 0.3% by weight of one of the following compounds:
  benzoic sulfimide (saccharin) (BS)
  4-(methylsulfonyl)phenylhydrazine (MSPH)
  1-acetyl-2-phenylhydrazine (APH)
  4-nitrophenylhydrazine (NPH)
  (2,4-dinitrophenyl)hydrazine (DNPH)

These solutions were stirred in the presence of air for circa 24 hours. Employing the methods described above, the fixation times of the five compositions were determined on M8×30 bolts made of class 6.8 and class 8.8 as well as the unscrewing braking torque obtained after two hours and after 24 hours of anaerobic hardening at room temperature on M8×30 class 6.8 bolts.

TABLE NO. 5

| Accelerator | Fixation Time | | $C_{FD}$ | |
|---|---|---|---|---|
| | Steel 6.8 | Steel 8.8 | 2 hrs. at 23° C. | 24 hrs. at 23° C. |
| BS | 25 min. | >2 hrs. | 2 Nm | 12 Nm |
| MSPH | 40 min. | >2 hrs. | 4 Nm | 8 Nm |
| APH | 60 min. | >2 hrs. | <1 Nm | 6 Nm |
| NPH | 15 min. | 50 mins. | 8 Nm | 10 Nm |

TABLE NO. 5-continued

| Accelerator | Fixation Time | | C_FD | |
|---|---|---|---|---|
| | Steel 6.8 | Steel 8.8 | 2 hrs. at 23° C. | 24 hrs. at 23° C. |
| DNPH | >2 hrs. | >2 hrs. | <1 Nm | <1 Nm |

Although the use of a nitrogen compound such as a tertiary amine as an auxiliary accelerator for anaerobic hardening is a known method, and particularly effective in the case of certain compositions in which the principal accelerator is saccharin (see, for example, U.S. Pat. No. 3,218,305) or the nitrophenylhydrazines (see, for example, FR Patent No. 283,191), it can be seen from these results that with MSPH it is possible to eliminate the addition of this type of co-accelerator. In fact, by comparing the results of this example with those of Example 1, it can be seen that the fixation times and torques obtained are not as good as those obtained with MSPH under the same conditions but without the assistance of any auxiliary accelerators. In contrast to certain known accelerators of anaerobic hardening, such as saccharin or the nitrophenylhydrazines, the use of 4-(methylsulfonyl)phenylhydrazine in accordance with the present invention makes it possible to formulate anaerobic compositions that have high performances without it being necessary to add auxiliary accelerators such as the aromatic amines.

EXAMPLE 6

A comparison was carried out here of the efficacy of three accelerators based on the combination of saccharin and an aminated co-accelerator, including the 4-methylsulfonylhydrazine in accordance with the invention.

To accomplish this, three batches of mother solution with the following composition were prepared:

| triethylene glycol dimethacrylate | 100 g |
|---|---|
| stabilizing solution (cf. Example 1) | 0.5 g |
| 75% cumyl hydroperoxide | 4 g | to which of each the following compounds were added:

| saccharin | 0.4 g |
|---|---|
| co-accelerator | 0.3 g | with the co-accelerator being dimethylparatoluidine (DMpT), 1-acetyl-2phenylhydrazine (APH) and 4-(methylsulfonyl)phenylhydrazine (MSPH), respectively.

Table 6 below shows the compositions of the formulations examined and their characteristics. The sign indicates that the setting times were greater than two hours, a time period beyond which the experiment was not continued. The torques on M6.8 steel bolts were measured after two hours of polymerization at room temperature.

TABLE 6

| Accelerator | Stability at 82° C. | Setting Time on | | | Torque on M6.8(Nm) |
|---|---|---|---|---|---|
| | | M6.8 | Z5F | glass | |
| DMpT | 1-2 hrs. | 25 | | | 6 |
| APH | 50-70 hrs. | 8 | 100 | 50-70 | 17 |
| MSPH | 80-120 hrs. | 3 | 70 | 60 | 18 |

It can easily be seen that the accelerator yielding both the highest stabilities (at 82° C.) and the highest reactivites is MSPH. The compositions containing MSPH are notably the only systems that harden between glass slides. The stability of the MSPH/saccharin system is excellent (more than 80 hours at 82° C.) and the torques obtained at two hours at room temperature reveal a reactivity identical to that of APH and greatly superior to that of the system based on DMpT.

EXAMPLE 7

The base formulation was the same as that employed in Example 6 to which was added 6.3 g of a saccharin-free accelerator containing dichloroacetic acid. The composition of these formulations was as follows:

| 75% cumyl hydroperoxide | 4 g |
|---|---|
| dichloroacetic acid | 2 g |
| accelerator | 0.3 g | with the accelerator being dimethylparatoluidine (DMpT), 1-acetyl-2-phenylhydrazine (APH) and 4-(methylsulfonyl)phenylhydrazine (MSPH), respectively.

The results obtained under the same conditions as in Example 6 are shown in Table 7.

TABLE 7

| Accelerator | Stability at 82° C. | Setting Time on | | | Torque on M6.8(Nm) |
|---|---|---|---|---|---|
| | | M6.8 | Z5F | glass | |
| DMpT | 1-2 hrs. | 80 | | | 0 |
| APH | 7-22 hrs. | 5 | 30 | | 17 Nm |
| MSPH | 7-22 hrs. | 3 | 55 | 55 | 17 Nm |

EXAMPLE 8

The "setting time on glass" test was applied to the four formulations from Example 4.

The setting time obtained with the adhesive composition containing 4-(methylsulfonyl)-phenylhydrazine (MSPH) as accelerator was two hours. With the three other formulations, the slides were still not stuck together after 24 hours and the test was suspended. This confirmed the remarkable advantage of MSPH in the anaerobic composition formulations with a setting speed that is barely influenced by the nature of the substrate.

All of the results presented demonstrate the considerable advantage resulting from the use of 4-(methylsulfonyl)phenylhydrazine as an accelerator for anaerobic compositions, or as a co-accelerator of saccharin, both with regard to the stability of the formulation in prolonged storage and the speed of setting on diverse metallic materials and even on nonmetallic materials (glass).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An anaerobic adhesive composition comprising a polyacrylic ester or a mixture of polyacrylic esters capable of radical polymerization at room temperature, at least one substance capable of initiating the radical polymerization of the said polyacrylic ester or esters by generation of free radicals as soon as the mixture is removed from the action of oxygen, and of maintaining or accelerating this polymerization, at least one alkylsulfonylphenylhydrazine.

2. The compositions of claim 1, wherein the proportion of alkylsulfonylphenylhydrazine in relation to the totality of the composition is between about 0.1 and 3% by weight.

3. The compositions of claim 1, wherein the alkylsulfonylphenylhydrazine is 4-(methylsulfonyl)phenylhydrazine.

4. The composition of claim 3, also containing a proportion between about 0.1 and 5% by weight of an organic hydroperoxide.

5. The composition of claim 4, also containing a co-accelerator a proportion between about 0.05 and 3% by weight of an organic sulfimide.

6. An anaerobic adhesive composition comprising a polyacrylic ester or a mixture of polyacrylic esters capable of radical polymerization at room temperature and based, on the total weight of the composition, about 0.1 to 3% by weight of 4-(methylsulfonyl)phenylhydrazine, about 0.1 to 5% by weight of an organic hydroperoxide, and about 0.05 to 3% by weight of an organic sulfimide.

7. A method of securely adhering at least two mating metal pieces made of galvanized or bichromated steel comprising applying an anaerobic adhesive to at least one of said two metal pieces and then mating said at least two metal pieces, said anaerobic adhesive being an adhesive of any one of claims 1 to 6.

* * * * *

UNITED STATES PATENT AND TRADEMARK OFFICE
CERTIFICATE OF CORRECTION

PATENT NO. : 5,109,036

DATED : April 28, 1992

INVENTOR(S) : BRUNO, Charriere

It is certified that error appears in the above-identified patent and that said Letters Patent is hereby corrected as shown below:

Column 3, line 59, cancel "856.34" and substitute therefor --85634--.

Column 10, line 32, where missing under the headings "Z5F" and "glass", in each, insert the following sign --∞--.

Signed and Sealed this

Twenty-first Day of September, 1993

Attest:

BRUCE LEHMAN

Attesting Officer     Commissioner of Patents and Trademarks